United States Patent
Zhang et al.

(10) Patent No.: US 11,640,012 B2
(45) Date of Patent: May 2, 2023

(54) VIRTUAL HIGH-DENSITY WELL SURVEY

(71) Applicant: Schlumberger Technology Corporation, Sugar Land, TX (US)

(72) Inventors: Zhengxin Zhang, Spring, TX (US); Wei Chen, Katy, TX (US); Yuelin Shen, Spring, TX (US); Zhenyu Chen, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 87 days.

(21) Appl. No.: 16/790,529

(22) Filed: Feb. 13, 2020

(65) Prior Publication Data

US 2021/0254437 A1 Aug. 19, 2021

(51) Int. Cl.
| | |
|---|---|
| *G01V 99/00* | (2009.01) |
| *E21B 49/00* | (2006.01) |
| *G06F 30/20* | (2020.01) |
| *G06F 113/08* | (2020.01) |
| *E21B 44/00* | (2006.01) |
| *G01V 3/18* | (2006.01) |

(Continued)

(52) U.S. Cl.
CPC ............ *G01V 99/005* (2013.01); *E21B 49/00* (2013.01); *G06F 30/20* (2020.01); *E21B 44/00* (2013.01); *E21B 44/02* (2013.01); *E21B 47/00* (2013.01); *E21B 47/02* (2013.01); *E21B 47/12* (2013.01); *E21B 2200/20* (2020.05); *G01V 1/302* (2013.01); *G01V 3/18* (2013.01); *G01V 3/20* (2013.01); *G06F 2113/08* (2020.01)

(58) Field of Classification Search
CPC .......... E21B 49/00; E21B 44/02; E21B 47/12; E21B 47/00; E21B 44/00; E21B 2200/20; E21B 47/02; G06F 30/20; G06F 2113/08; G01V 3/18; G01V 1/302; G01V 3/20; G01V 99/005
USPC ......................................................... 703/10
See application file for complete search history.

(56) References Cited

U.S. PATENT DOCUMENTS

| | | |
|---|---|---|
| 6,405,808 B1 | 6/2002 | Edwards et al. |
| 2003/0024738 A1 | 2/2003 | Schuh |

(Continued)

FOREIGN PATENT DOCUMENTS

| | | | |
|---|---|---|---|
| WO | 2016179766 A1 | 11/2016 | |
| WO | WO-2016179766 A1 * | 11/2016 | ......... E21B 47/0006 |

OTHER PUBLICATIONS

Search Report and Written Opinion of International Patent Application No. PCT/US2021/016813 dated May 27, 2021, 9 pages.

*Primary Examiner* — John E Johansen

(57) ABSTRACT

A method for determining tortuosity, e.g., in an oilfield well includes obtaining a planned trajectory for a hole, and obtaining a first survey of the hole using a sensor deployed into the hole. The first survey includes a first surveyed position at a first depth of the hole and a second surveyed position at a second depth of the hole, and no surveyed positions between the first and second depths. The method further includes simulating a second survey of the hole between the first and second depths using a model. The second survey includes a plurality of simulated positions of the hole between the first and second depths. The method includes determining that the simulated position at the second depth is proximal to the second surveyed position, and visualizing a trajectory of the hole based on the first and second surveys.

21 Claims, 15 Drawing Sheets

(51) Int. Cl.
     *E21B 44/02*   (2006.01)
     *E21B 47/00*   (2012.01)
     *E21B 47/12*   (2012.01)
     *E21B 47/02*   (2006.01)
     *G01V 1/30*    (2006.01)
     *G01V 3/20*    (2006.01)

(56) References Cited

U.S. PATENT DOCUMENTS

| | | | |
|---|---|---|---|
| 2015/0226052 A1* | 8/2015 | Samuel | E21B 47/022 |
| | | | 700/275 |
| 2019/0292900 A1 | 9/2019 | Bang et al. | |
| 2020/0149386 A1* | 5/2020 | Menand | E21B 7/04 |
| 2020/0256181 A1* | 8/2020 | Jamieson | G01V 1/50 |
| 2021/0058235 A1* | 2/2021 | Rangarajan | E21B 49/00 |

* cited by examiner

VIRTUAL HIGH-DENSITY WELL SURVEY

BACKGROUND

In the oil and gas field, well plans are developed to prescribe a geometry and trajectory for a well to be drilled. During the drilling process, the location of the drilling assembly (e.g., a bottom hole assembly or BHA) is determined through directional surveys. The directional surveys are generally taken a certain intervals while drilling, e.g., at depth intervals such as 30 meters (different systems may use different interval measurements). The deviation from the planned location and the measured location at the survey points may be used to calculated wellbore tortuosity, generally considered to be deviation or undulation around the trajectory of the original plan.

However, surveys taken at intervals, referred to as "static surveys," may not provide information about wellbore tortuosity between the survey points. Continuous surveys, by contrast, which continuously survey the location of the BHA, do not suffer from such a drawback, as there may not be an appreciable interval between measurements. However, continuous surveys may be difficult to implement or not available, for a variety of reasons, including cost and low available data transmission rates from downhole.

SUMMARY

A method is disclosed. The method includes obtaining a planned trajectory for a hole, and obtaining a first survey of the hole using a sensor deployed into the hole. The first survey includes a first surveyed position at a first depth of the hole and a second surveyed position at a second depth of the hole, and the first survey does not include any surveyed positions at any depth between the first and second depths. The method also includes simulating a second survey of a first portion of the hole between the first and second depths using a model. The second survey includes a plurality of simulated positions of the hole, including a simulated position at the second depth and one or more simulated positions at one or more depths between the first and second depths. The method further includes determining that the simulated position at the second depth is proximal to the second surveyed position within a tolerance, and visualizing a trajectory of the hole based on the first and second surveys.

A non-transitory computer-readable medium is disclosed, which stores instructions that, when executed by one or more processors of a computing system, cause the computing system to perform operations. The operations include obtaining a planned trajectory for a hole, and obtaining a first survey of the hole using a sensor deployed into the hole. The first survey includes a first surveyed position at a first depth of the hole and a second surveyed position at a second depth of the hole, and the first survey does not include any surveyed positions at any depth between the first and second depths. The operations also include simulating a second survey of a first portion of the hole between the first and second depths using a model. The second survey includes a plurality of simulated positions of the hole, including a simulated position at the second depth and one or more simulated positions at one or more depths between the first and second depths. The operations further include determining that the simulated position at the second depth is proximal to the second surveyed position within a tolerance, and visualizing a trajectory of the hole based on the first and second surveys.

A computing system is also disclosed. The computing system includes one or more processors, and a memory system including one or more non-transitory computer-readable media storing instructions that, when executed by at least one of the one or more processors, cause the computing system to perform operations. The operations include obtaining a planned trajectory for a well, and obtaining a first survey of the well using a sensor deployed into the well. The first survey includes a first surveyed position at a first depth of the well and a second surveyed position at a second depth of the well, and the first survey does not include any surveyed positions at any depth between the first and second depths. The operations also include simulating a second survey of a first portion of the well between the first and second depths using a model. The second survey includes a plurality of simulated positions of the well, including a simulated position at the second depth and one or more simulated positions at one or more depths between the first and second depths. The operations further include determining that the simulated position at the second depth is proximal to the second surveyed position within a tolerance, and visualizing a trajectory of the hole based on the first and second surveys.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). One or more other constraints may be imposed, for example, consider one or more constraints germane to capabilities of tools being used and/or one or more constraints related to drilling time and risk tolerance.

A well plan can be generated based at least in part on imposed constraints and known information. As an example, a well plan may be provided to a well owner, approved, and then implemented by a drilling service provider (e.g., a directional driller or "DD").

A well design system can account for one or more capabilities of a drilling system or drilling systems that may be utilized at a wellsite. As an example, a drilling engineer may be called upon to take such capabilities into account, for example, as one or more of various designs and specifications are created.

A well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

Figure 1:
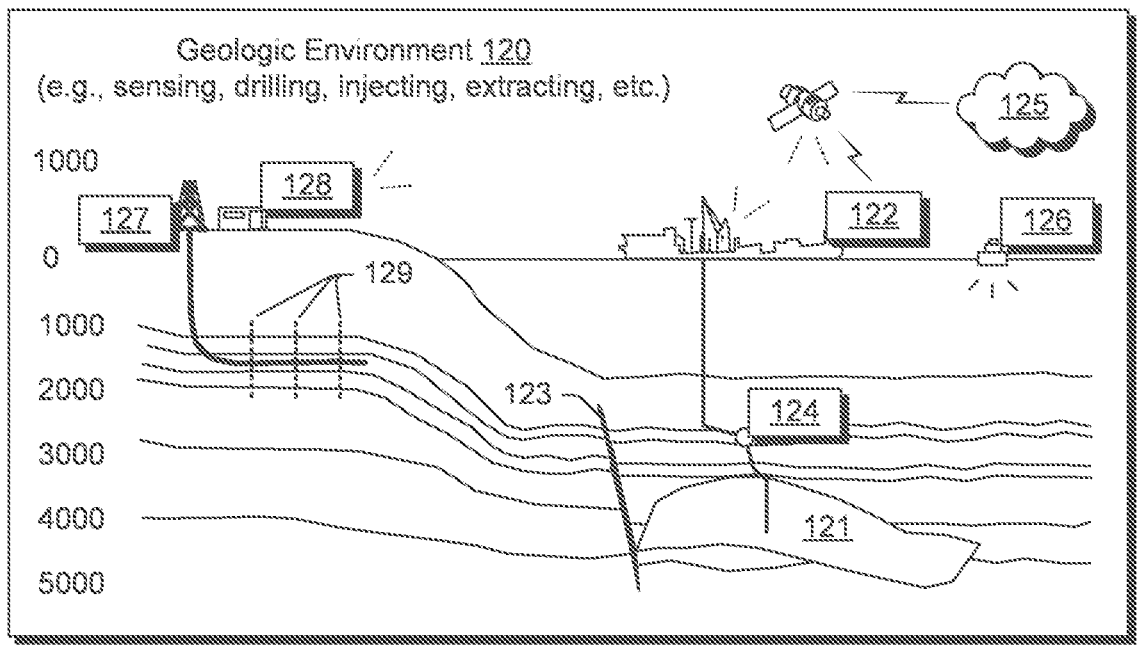
FIG. 1 illustrates equipment in a geologic environment, according to an embodiment.
Figure 1:
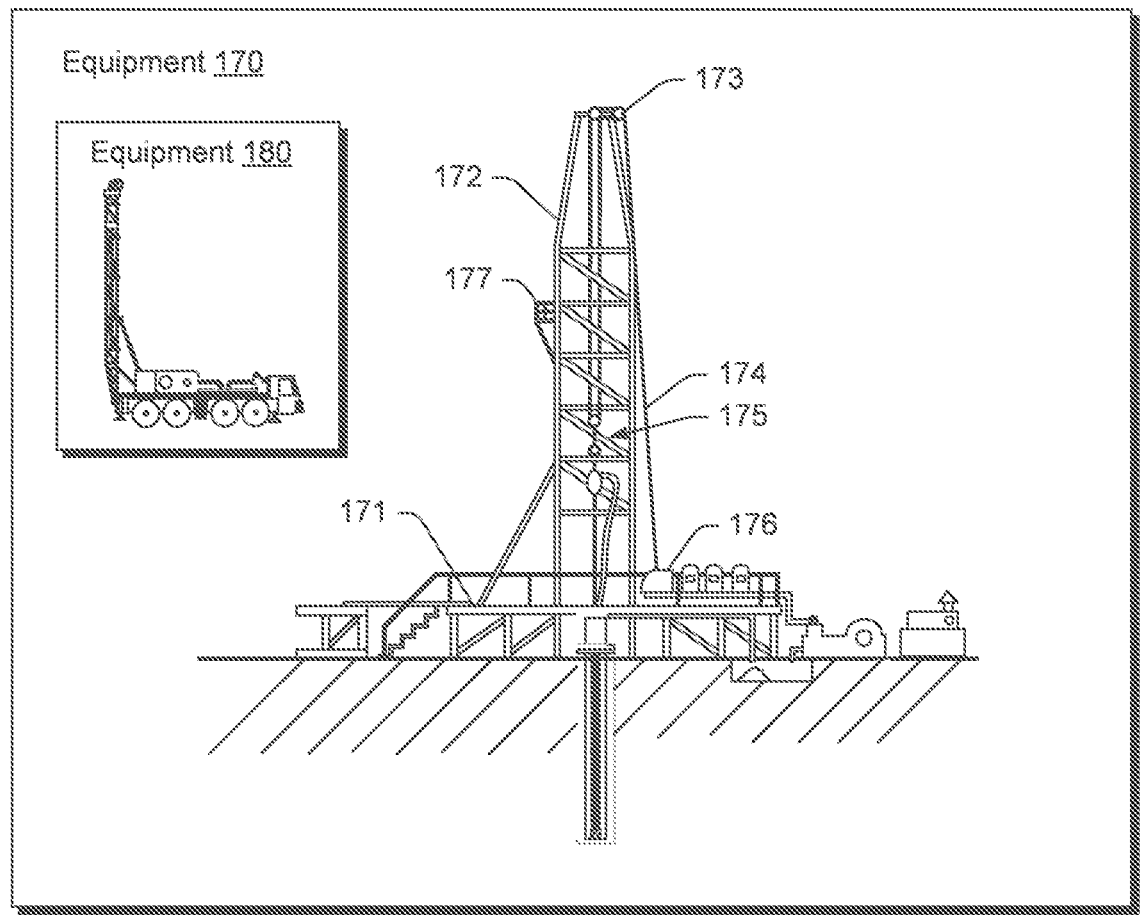

FIG. 1 illustrates a schematic view of an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

A crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

A derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
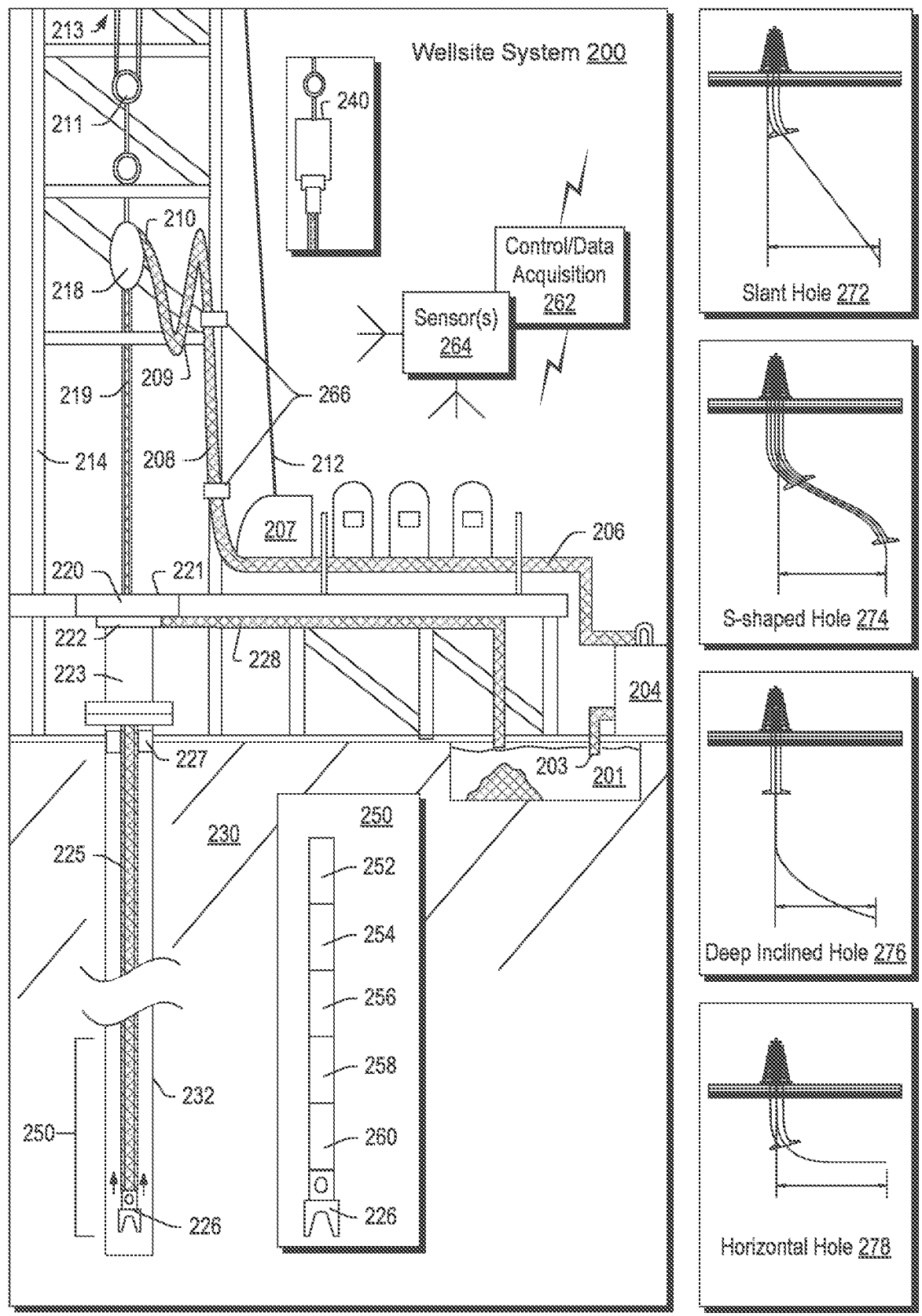
FIG. 2 illustrates a wellsite or drilling system and examples of types of wellbores, according to an embodiment.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventers (BOPS) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

Mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

Telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

The drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
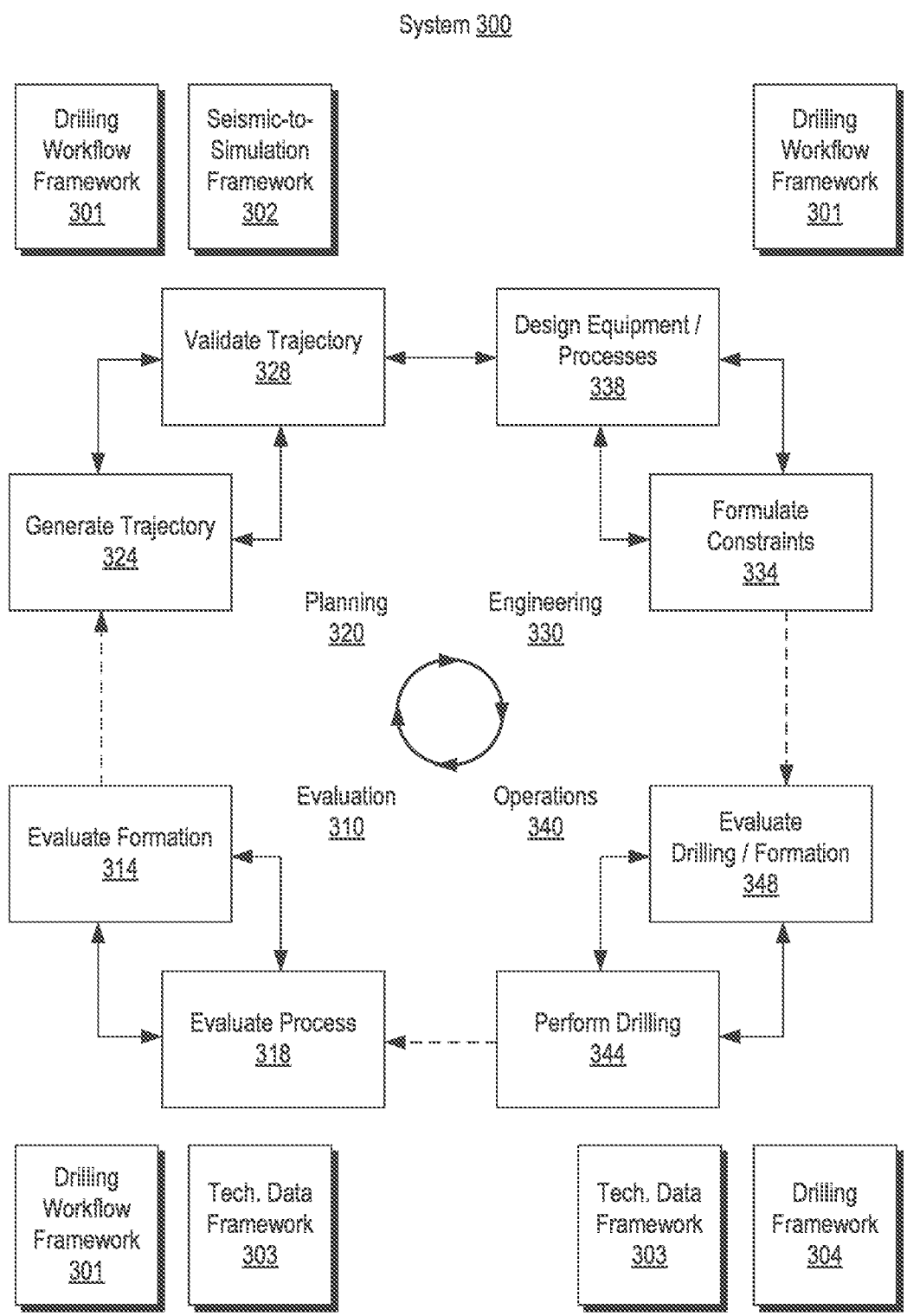
FIG. 3 illustrates a block diagram of a drilling system, according to an embodiment.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT'.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
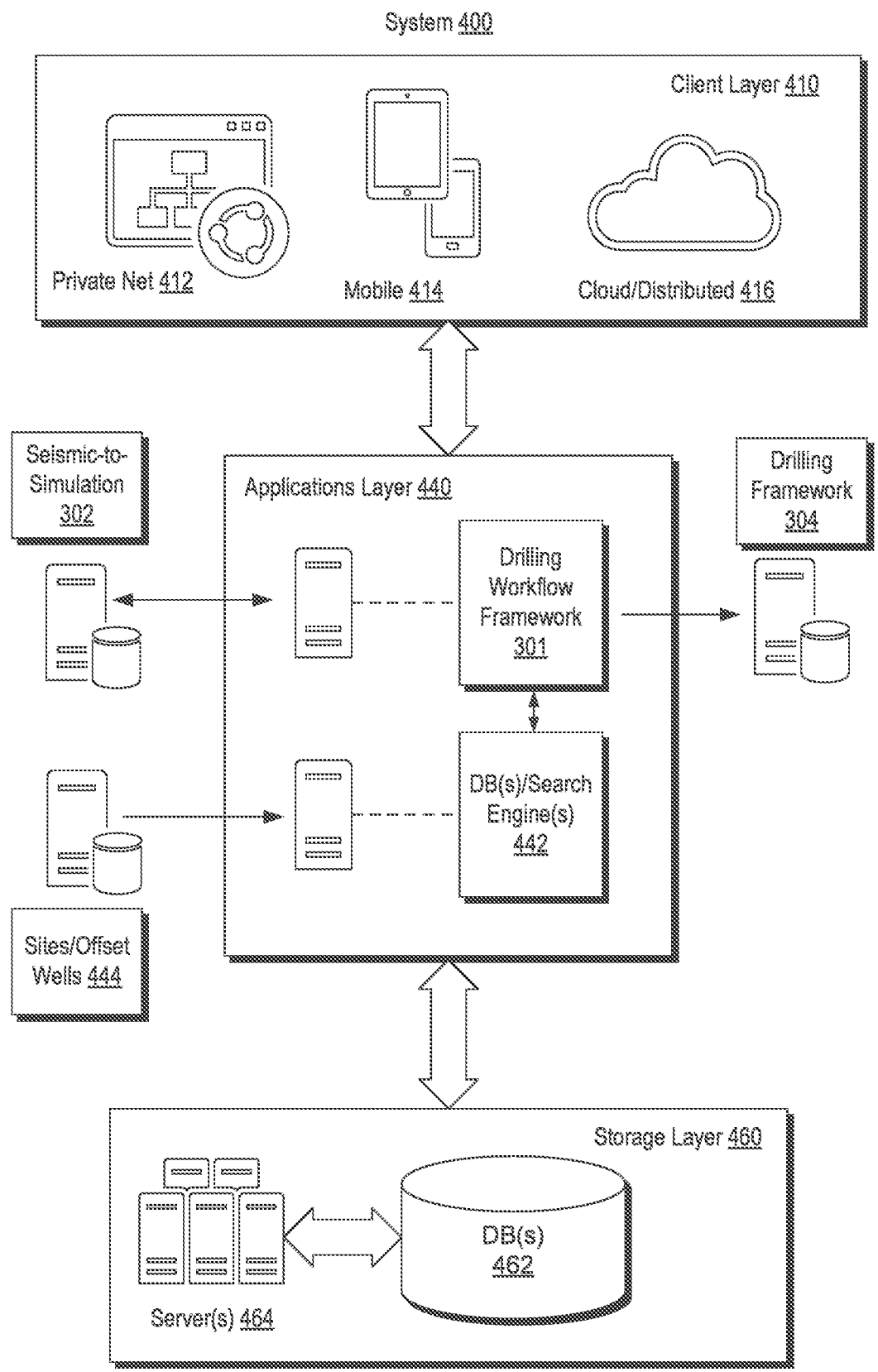
FIG. 4 illustrates a block diagram of another drilling system, according to an embodiment.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
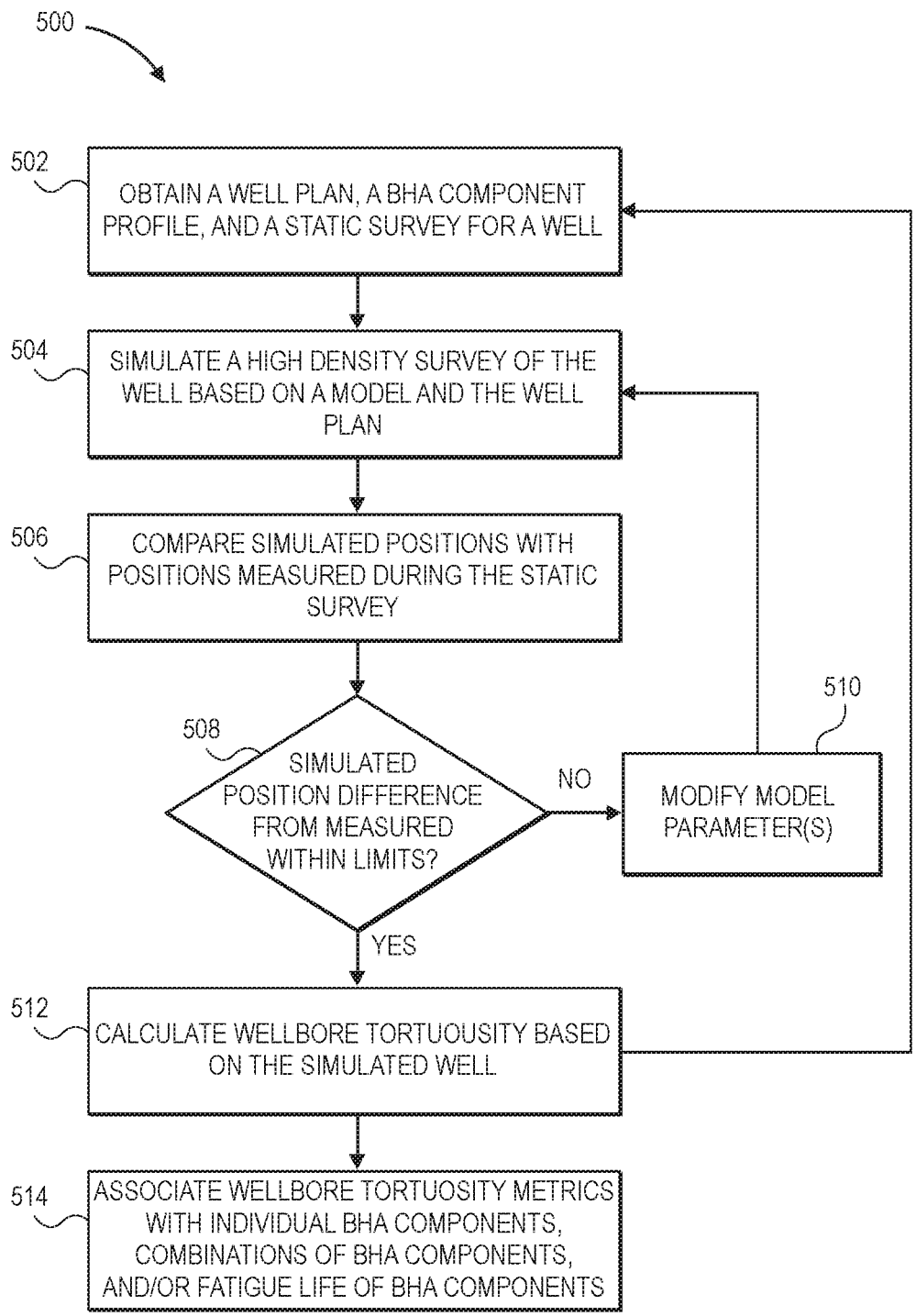
FIG. 5 illustrates a flowchart of a method for drilling, according to an embodiment.

FIG. 5 illustrates a flowchart of a method 500 for drilling a well, according to an embodiment. In particular, the method 500 may be tailored for determining wellbore tortuosity using a virtual high-density survey, which may, in turn, be used to generate accurate well plans for drilling subsequent wells, as will be described in greater detail below. Although described in the context of well drilling, the method 500 may be readily applied to casing or liner running problems due to tortuosity, casing or liner wear problem due to tortuosity, poor cementing quality due to tortuosity, rod pump wear due to tortuosity, etc.

In the illustrated example, the method 500 may begin with obtaining input, such as a well plan (or any other plan specifying a trajectory for a hole/borehole), a component (e.g., components of a BHA) "profile", and a static survey for a well, as at 502. The well plan may include a planned trajectory of the well, between a surface point to a target location (e.g., a hydrocarbon reservoir). The planned trajectory may be vertical, horizontal, deviated, etc. The BHA component profile may specify the motor, rotary steerable system (RSS), bit type, BHA dimensions/distances between components thereof, or other components, e.g., those components that may contribute to steering (and thus the trajectory differing from the planned trajectory), that are used to drill the well according to the well plan.

The input obtained at 502 may also include a static survey, completed during drilling (or afterwards), of the well (or another bore) according to the well plan. The static survey may establish measured positions of the well at various depths (e.g., at a certain interval) along the well. In at least some embodiments, the static survey may not include any measured positions at depths between the measured depths, e.g., the survey points are discrete, with unmeasured space being between the discrete survey depths.

The method 500 may then include simulating a high-density survey of the well (or another type of bore) based on a model and the well plan, as at 504. The model may take various parameters into consideration, including geological and/or geomechanical properties of the formation through which the well extends and characteristics of the BHA components. Factors that the model may take into account include the sliding sheet or directional drilling commands from the directional driller, actual drilling parameters, rate of penetration (ROP), friction, formation hardness, bit characteristics (e.g., side cutting effect, hole enlargement), and formation anisotropy. Further, in drilling with a motor BHA, the sliding sheet parameter indicates when the drilling process is sliding and gives the toolface orientation during sliding, and when the drilling process is rotating. For a rotary steerable system (RSS), the directional drilling commands may vary with RSS used. Generally, the commands include the toolface orientation and steering intensity. More steering intensity is applied when high dogleg severity is experienced. These steering information is critical for the model.

Accordingly, simulating using the model may establish a prediction of the well (or another bore) drilled under the particular conditions, and using the particular equipment, that were experienced when actually drilling the well.

The high-density survey may thus calculate a more-complete trajectory of the well, providing virtual survey points in addition to those provided by the static survey. Stated otherwise, the simulated survey may determine simulated positions at one or more (potentially many, to the point of being essentially continuous) depths in between the discrete, static survey depths, providing insight into the trajectory of the well between the static survey depths. Furthermore, the high-density survey may be displayed or "visualized", e.g., on a computer screen. The visualization of the high-density survey may allow for a more accurate understanding of the borehole trajectory likely to result from a planned drilling operation under known conditions. This may facilitate planning of subsequent wells.

The measured positions of the well at the static survey depths, which are generally considered known, because they are measured to within an uncertainty of the sensor(s), may be used as markers to quality-check the simulated high-density survey. Accordingly, at least one section between two consecutive survey depths may be simulated, resulting in simulated positions at depths between the two consecutive survey depths, as well as at least one simulated position at the same depth as the measured, static survey position. These positions, static and simulated, which represent the position at the same depth, may then be compared, as at 506.

Figure 6:
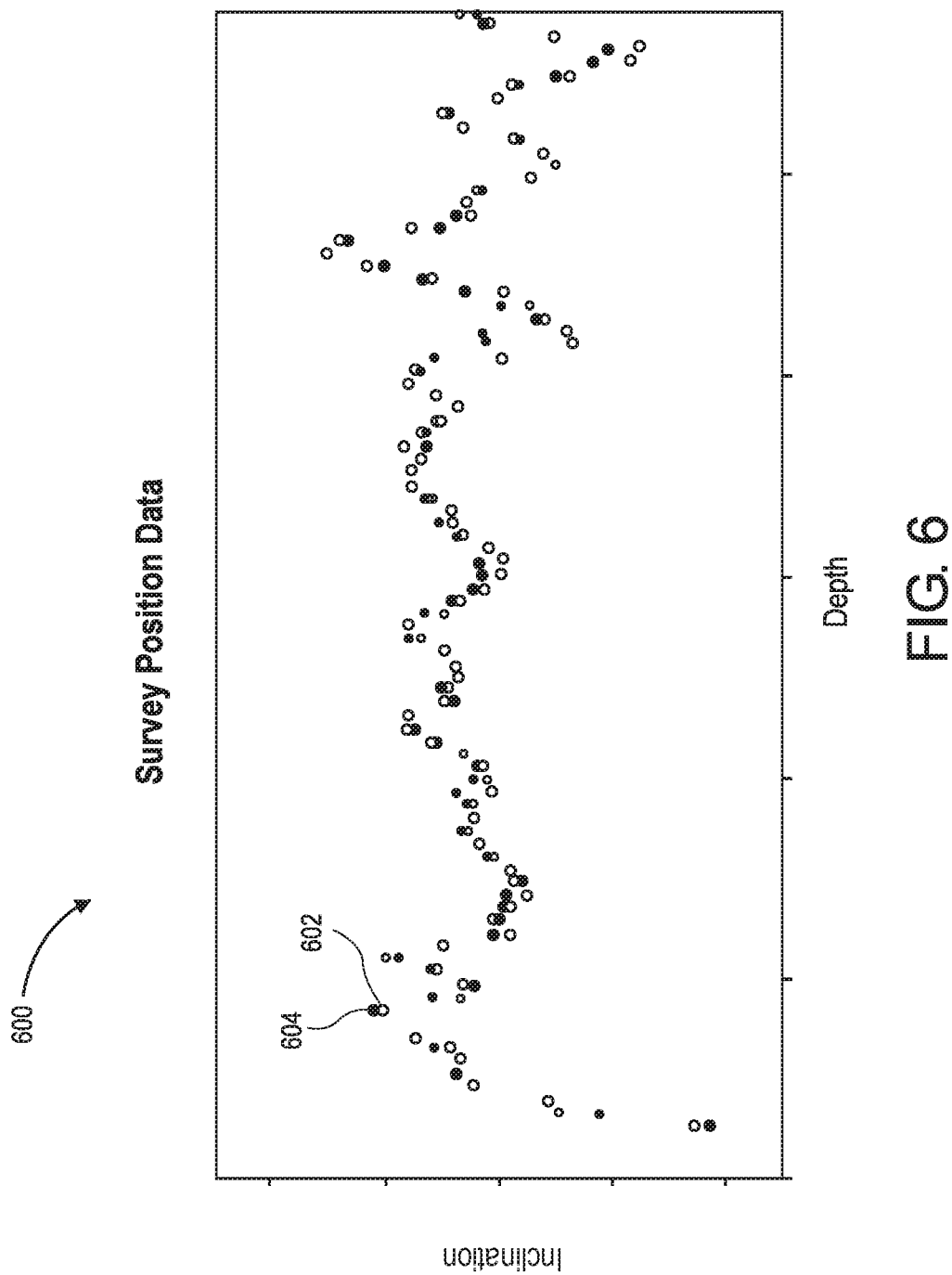
FIG. 6 illustrates a plot of survey position data, comparing inclination measured at survey depths with inclination simulated at the same depths, according to an embodiment.

FIG. 6 illustrates a plot 600 of a position measurement (in this case, inclination) versus depth for both a static survey and a virtual high-density survey, according to an embodiment. Although inclination is shown, it will be appreciated that azimuth or any other position metric may also be used, in addition to or in lieu of inclination. In this view, virtual survey positions (inclinations) 602 are shown at depths corresponding to the static survey positions 604. The simulated positions at other depths, i.e., between the survey depths, are omitted from view. As can be seen, the virtual survey points 602 are near, but may not be exactly the same as the static survey points 604.

A tolerable error or "tolerance" may thus be established, either prior to the method 500 (e.g., as a predetermined constant, a selectable input variable from a user, etc.) or during the method 500 (e.g., dynamically using a best-case, average, another statistical metric, etc.). The tolerance may specify how close the simulated position at the surveyed depth should be to the measured position from the static survey at the same depth, in order to consider the simulation of this portion of the well to be "acceptable." Thus, the method 500 may, at 508, determine if the simulated position is proximal to the measured position within the tolerance. If it is, the simulation may be accepted.

Otherwise, the method 500 may move to 510, and may modify one or more parameters of the model being simulated. When tuning the model, the BHA geometry, drilling parameters, contact stiffness and friction may be fixed. Parameters may be adjusted, e.g., in the following sequence: bit side cutting coefficient, hole enlargement coefficient and formation anisotropy. In order to tune a parameter, a series of parameter candidates may be generated by using a small incremental change with in a pre-defined range, then run simulation in parallel to find which candidates gives the closest results. The tuning is considered as complete if the tolerance requirement is met, even there is one or more parameters that have not been tuned.

Once the one or more parameters are adjusted at 510, the method 500 may loop back to 504, and may again simulate the high-density survey using the model with the adjusted parameter(s), until, eventually, the simulation is deemed acceptable at 508.

When the simulation is accepted at 508, the method 500 may move to calculating wellbore tortuosity based on the virtual high-density survey and the planned well, as at 512. As mentioned above, wellbore tortuosity may be, generally, a value corresponding to the difference between the planned well trajectory and the trajectory actually taken (in this case, represented by the virtual high-density survey). Thus, the virtual high-density survey may account for small deviations ("micro-tortuosities") between the surveyed depths.

Figure 7:
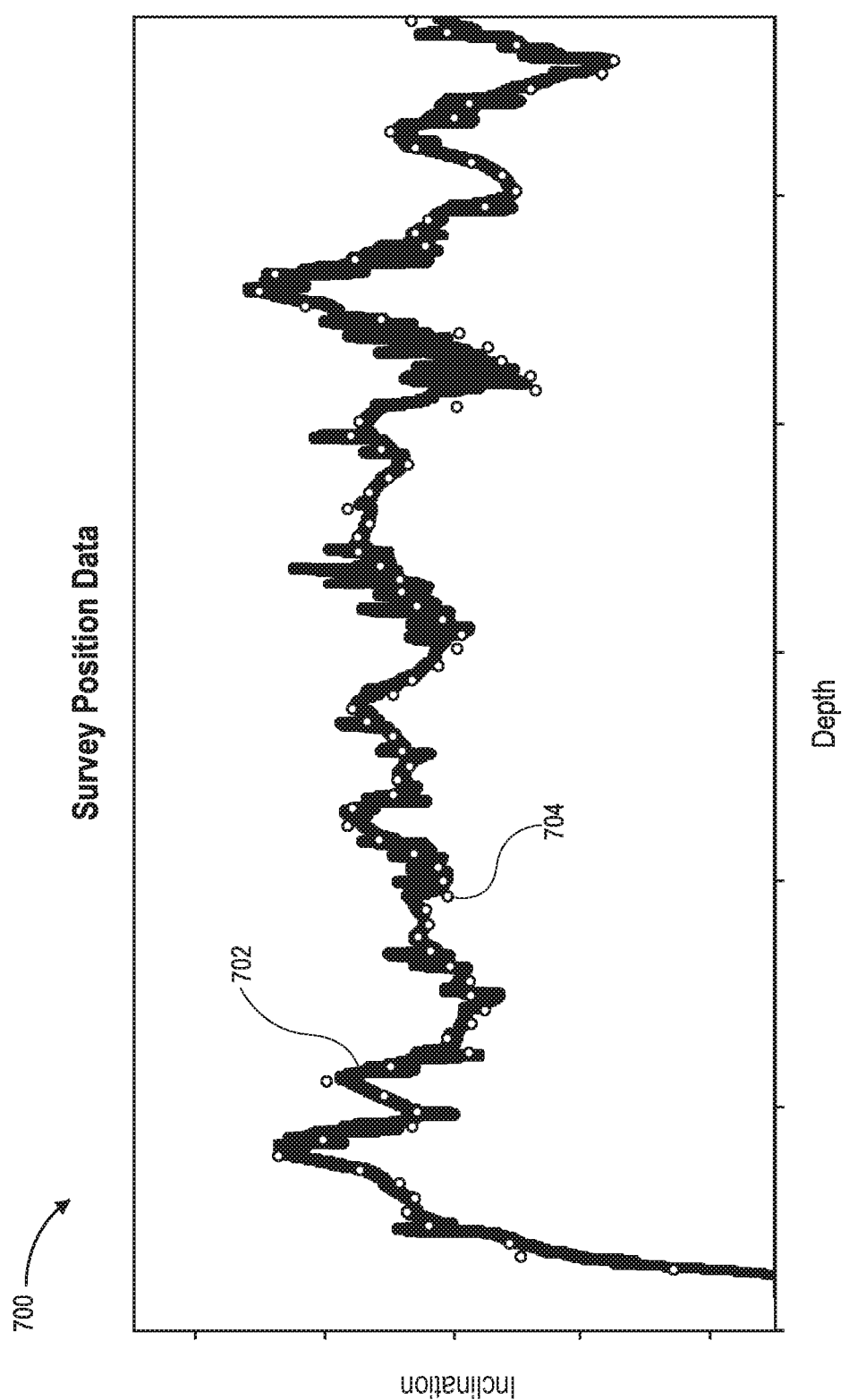
FIG. 7 illustrates a plot of survey position data, specifically a virtual high-density survey, along with the static survey positions, according to an embodiment.

FIG. 7 illustrates a plot 700 of a virtual high-density survey 702, also showing the static survey points 704. The virtual high-density survey 702, visualized as shown and mentioned above, accurately depicts wellbore position between the static survey depths, as well as providing agreement with the measured, static survey positions. From the virtual high-density survey 702, wellbore tortuosity may be calculated.

There are many different ways to calculate wellbore tortuosity. One way, which should be considered merely one example among many, is cumulative dogleg, or Cdlg. Cdlg may be calculated as follows:

$$Cdlg = \int_{MD_2}^{MD_1} dlg(l)dl$$

which expands to:

$Cdlg =$ $$\int_{MD_2}^{MD_1} \cos^{-1}[\sin(Inc_1)\sin(Inc_2)\cos(Azim_2 - Azim_1) + \cos(Inc_1)\cos(Inc_2)]dl$$

where dl is the virtual high: density depth interval for which position calculations are conducted, $MD_1$ and $MD_2$ are two measured depths, $Inc_1$ and $Azim_1$ are the inclination and azimuth at a certain measured depth between MD1 and MD2, $Inc_2$ and $Azim_2$ are the inclination and azimuth at a measured depth adjacent to the depth at which $Inc_1$ and $Azim_1$ are measured.

Another way to calculate an index for wellbore tortuosity may include mean undesired dogleg severity or mDLS. mDLS may be calculated as follows:

$$mDLS_{undesired} = \frac{\int_{MD1}^{MD2} |DLS_{actual}(l) - DLS_{plan}(l)| dl}{MD_2 - MD_1}$$

Local Statistical Values (such as mean and standard deviation of the variation of inclination or DLS) may be calculated, where $$m_1 = \frac{\sum_{i=0}^{N-1} \Delta Inc_2^i}{N}, \quad std_1 = \sqrt{\frac{\sum_{i=0}^{N-1} (\Delta Inc_2^i - m_1)^2}{N}}$$

$$m_2 = \frac{\sum_{i=0}^{N-1} \Delta DLS_{actual}^i}{N}, \quad std_2 = \sqrt{\frac{\sum_{i=0}^{N-1} (\Delta DLS_{actual}^i - m_2)^2}{N}}$$

and where $\Delta DLS_{actual}$ is difference between the DLS of two adjacent survey points and N is the number of survey points.

The virtual: high density survey 702 can be calculated in real-time, e.g., while drilling the well. Accordingly, the survey 702 may be employed to evaluate drilling conditions in real-time. For example, during drilling, torque and drag calculations can be conducted using the virtual high: density survey, e.g., instead of or in addition to using static surveys or planned trajectories. This can improve the accuracy of torque and drag calculation, facilitating an identification of adverse drilling conditions. In another example, the virtual high-density survey may be employed to calculate tool fatigue failure risks, which may capture the risks due to micro DLS. The virtual high: density survey can also be used for other applications in real-time, such as evaluating hole cleaning efficiency and risks.

Figure 8:
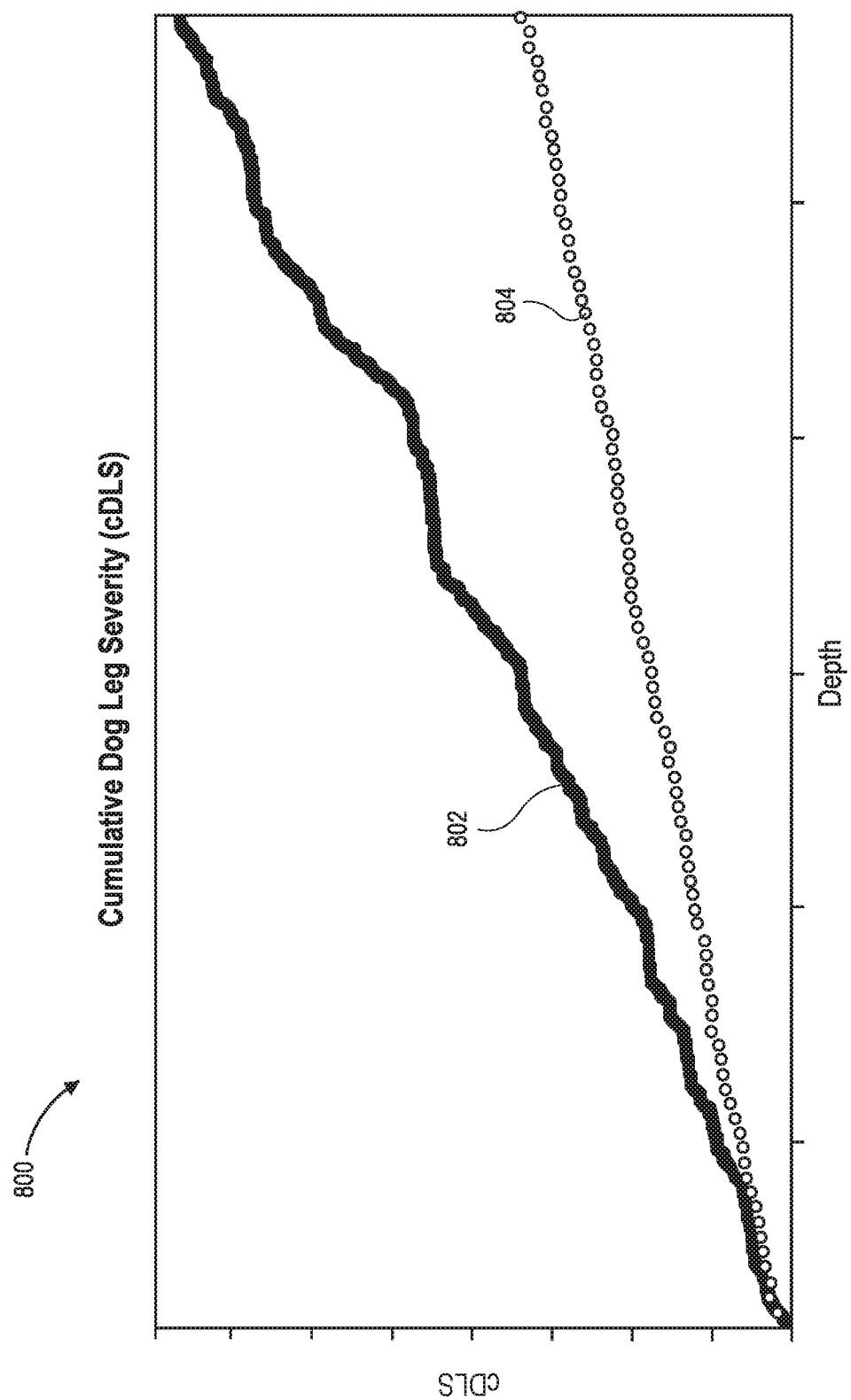
FIG. 8 illustrates a plot of cumulative dog leg severity (cDLS), showing a comparison of the cDLS calculated using the static survey, and cDLS calculated using the virtual high-density survey, according to an embodiment.

FIG. 8 illustrates an example of a plot 800 of Cdlg based on inclination as a function of depth, according to an embodiment. As shown, there are two Cdlg calculated, represented by sets of points 802 and 804, one set 802 for the virtual high: density survey and the other set 804 for the static survey. As can be seen, the Cdlg calculated using the virtual high-density survey captures more of the wellbore tortuosity.

Figure 9:
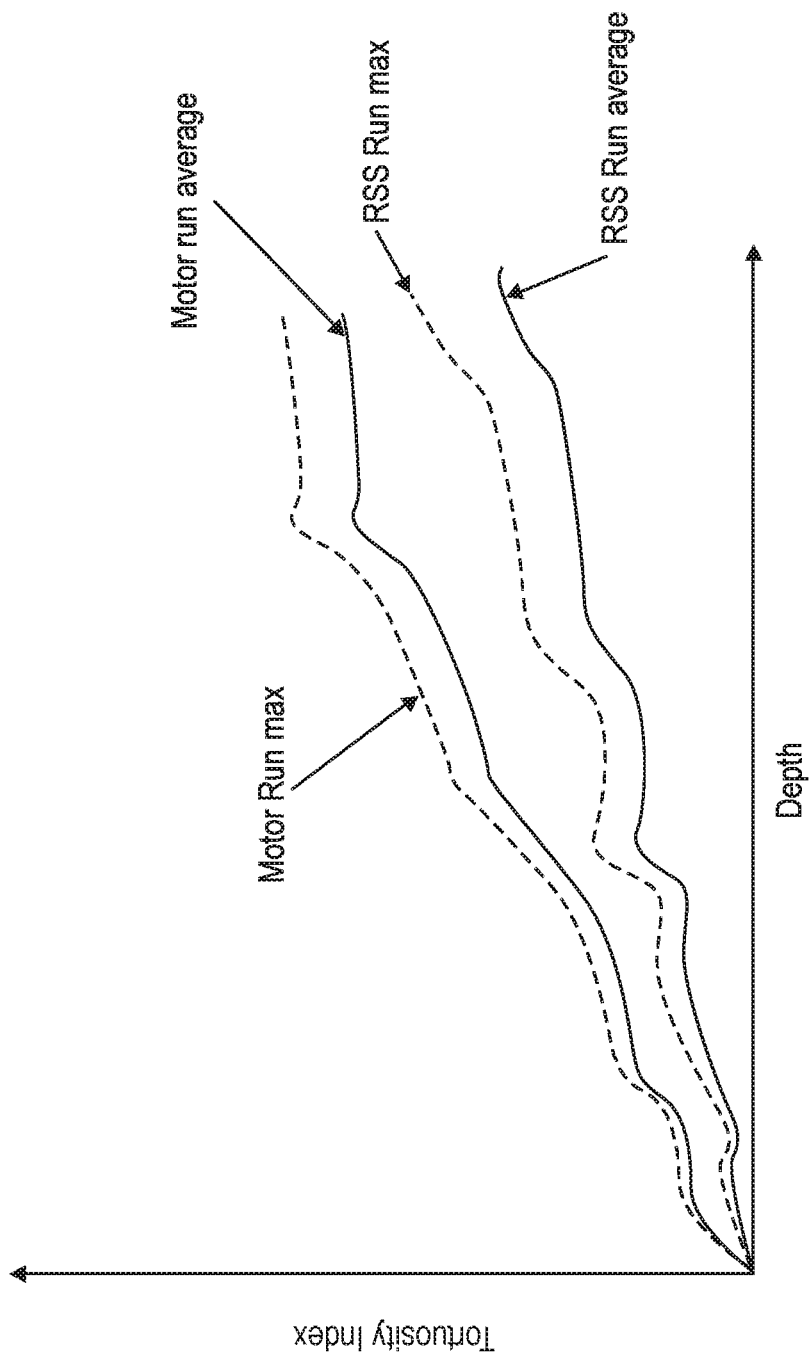
FIG. 9 illustrates a plot of tortuosity index versus depth for two bottom-hole assembly components, according to an embodiment.

Referring again to FIG. 5, once the wellbore tortuosity is calculated, as at 512, this metric may be applied to generate analytics related to the BHA components, as at 514. For example, the metric may be associated with specific combinations of RSS and motors, or RSS and bits, for example, such that, over time, as accurate tortuosity calculations are realized for the various combinations, an expected tortuosity for different component combinations may be determined. For example, as illustrated in FIG. 9, expected tortuosities for particular components may be plotted, both as an average and as a maximum. This may provide additional detail as to expected tortuosities for well planners when using a particular BHA.

Figure 10:
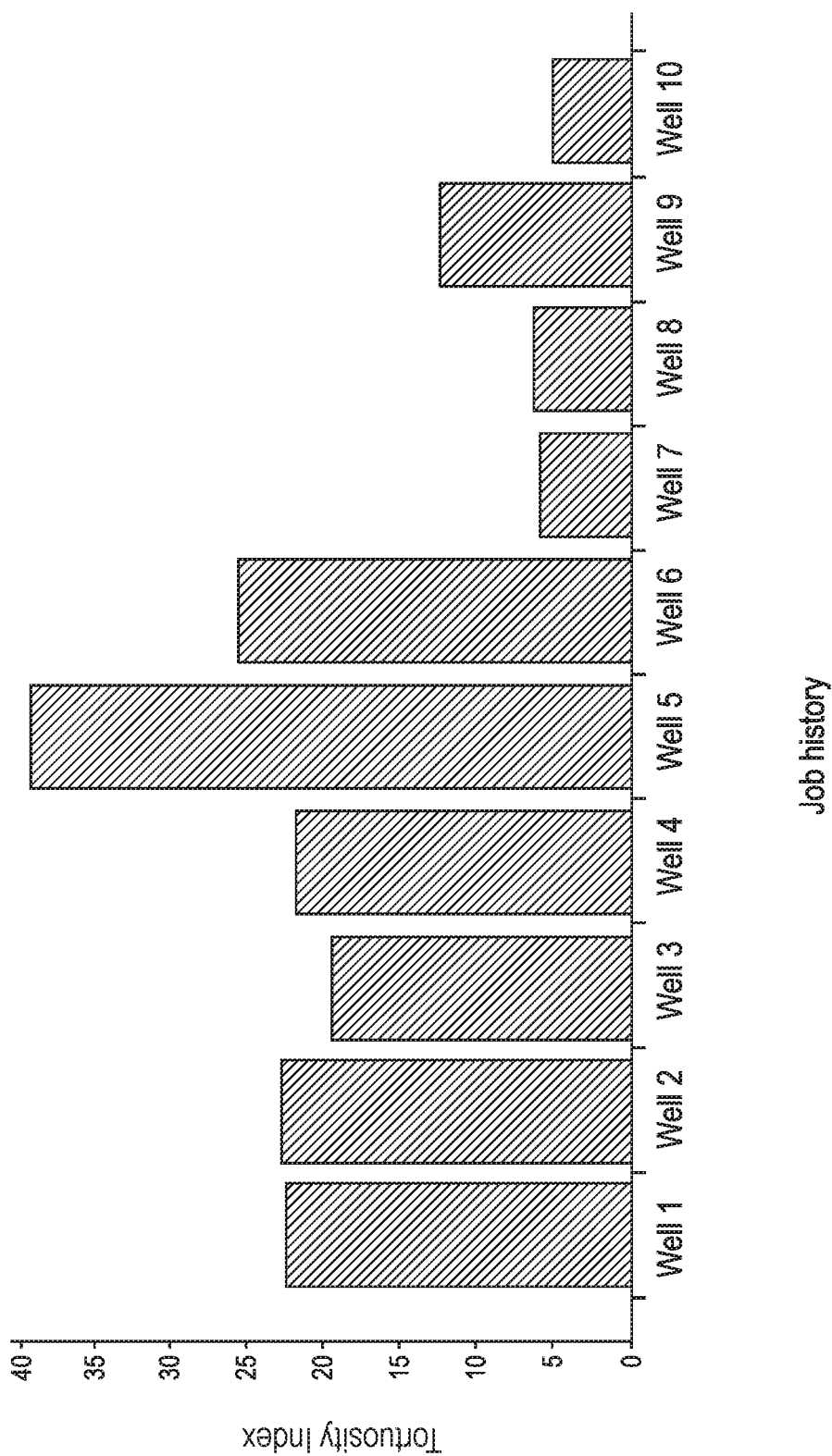
FIG. 10 illustrates a graph of tortuosity index values for the same BHA on successive drilling jobs, according to an embodiment.

Further, for example, as shown in FIG. 10, the tortuosity may be linked to fatigue life of the BHA components. For example, the BHA components may be used to drill several different wells, with the tortuosity varying for each well. Some of the tortuosity may be associated with factors such as geological/geophysical conditions, drilling parameters, well geometry, etc. Fatigue life of BHA components can be affected by wellbore tortuosity, which may be tracked across multiple drilling operations. Thus, if the tortuosity is higher than what would be expected, it may be used as an indication that one or more components of the BHA are nearing an end of their fatigue life.

Figure 11:
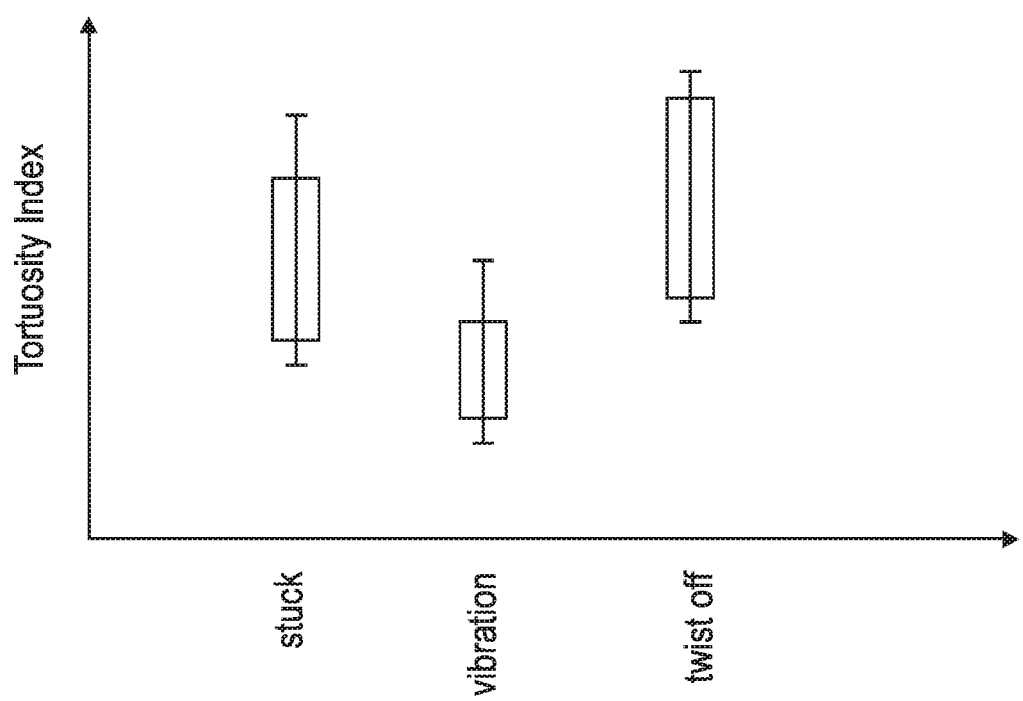
FIG. 11 illustrates a plot of tortuosity index ranges associated with drilling events or hazards, according to an embodiment.

In addition, the tortuosity index (however it is calculated) may be associated with drilling events that were experienced at particular locations. Thus, as shown in FIG. 11, a range of tortuosities may be associated with stuck pipe, vibration, and twist off. By monitoring tortuosity during real-time, drilling hazards may be predicted or avoided, e.g., by changing drilling parameters in on a drilling rig. Other problems related to bore hole tortuosity including not able to run casing or liner to the bottom, casing or liner wear from drilling next sections, poor cementing quality due to uneven cement thickness distribution, rod wear during production where the rod is reciprocal to drive the pump.

Figure 12:
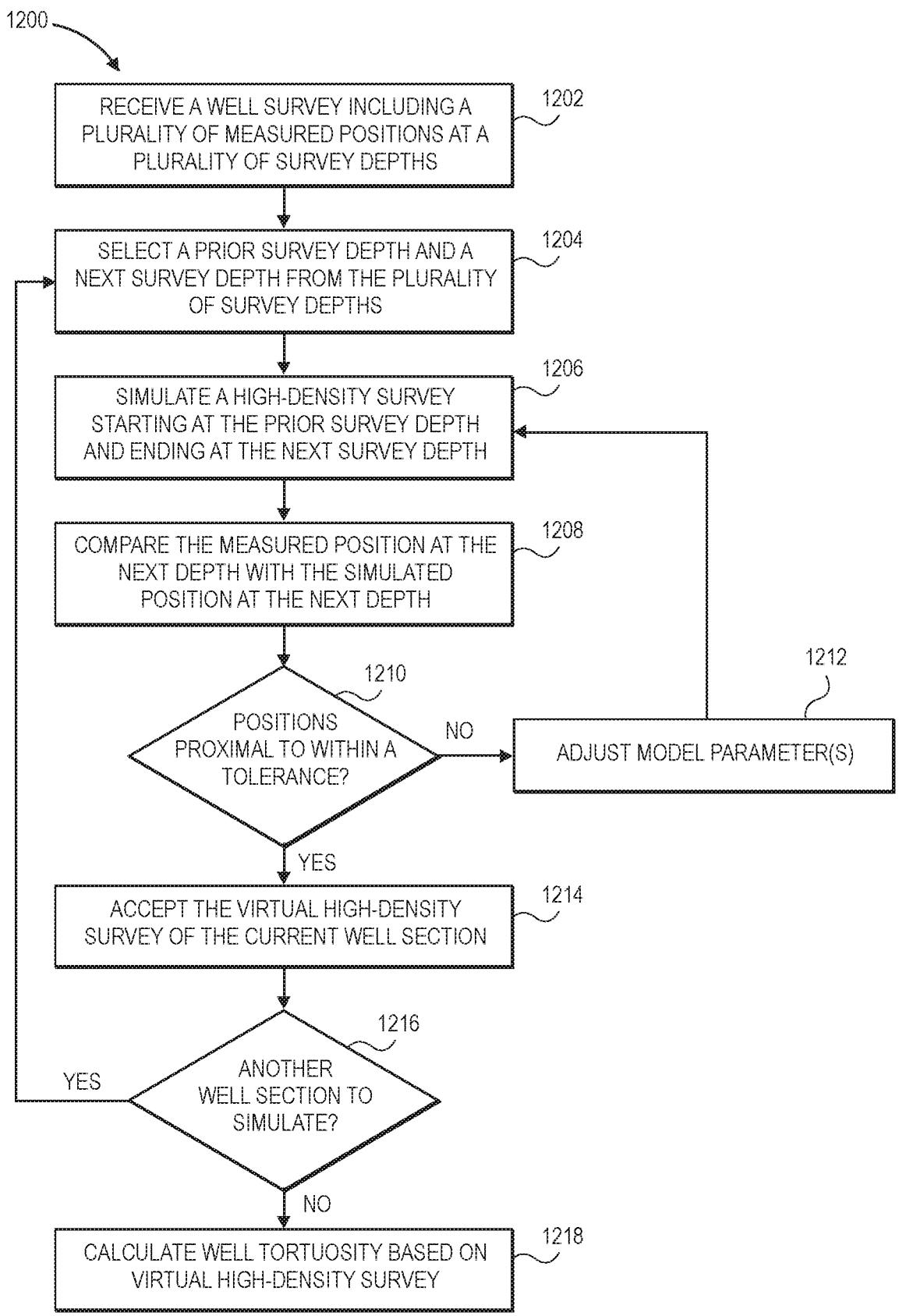
FIG. 12 illustrates another method for drilling, which may be a more specific example implementation of the method of FIG. 5, according to an embodiment.

FIG. 12 illustrates a flowchart of a method 1200 for drilling, according to an embodiment. In particular, the method 1200 may be an example implementation of the method 500 discussed above.

The method 1200 may begin by receiving a well survey including a plurality of surveyed positions at a plurality of survey depths, as at 1202. This may be the "static" survey, taken using sensors deployed into the well, which measure position data for the BHA in the well at different surveyed depths. In this example, the method 1200 may be configured to generate a virtual high-density survey (also referred to as a "simulated" survey) on a section-by-section basis, with the model that is used to conduct the simulation being updated, potentially after each section is simulated, and before moving on to the next section. This is merely an example though, and multiple sections could be evaluated in parallel and/or the method 1200 might update the model after simulating several sections.

In this example, the method 1200 may include selecting a "prior" survey depth and a "next" survey depth from the plurality of survey depths, as at 1204. The prior survey depth and the next survey depth may be any two consecutive depths at which survey positions are measured. In such static survey, there may not be any survey depths, that is, depths at which the location of the sensors are measured, between the prior survey depth and the next survey depth.

The method 1200 may then simulate the high-density survey starting at the prior survey depth and ending at the next survey depth, as at 1206. The simulation may rely on a model, as explained above, and may generate a simulated trajectory of the well between the prior and next survey depths. As part of this simulated trajectory, the virtual high-density survey may provide a plurality of simulated positions at a plurality of depths between the prior and next survey depths. In addition, the simulation of the high-density survey may include calculating a simulated position corresponding to the next survey depth.

The survey position at the next depth may then be compared with the simulated position at the next depth, as at 1208. The comparison may yield an "error", that is, a distance between the measured survey position at the next survey depth and the simulated position at the next survey depth. As noted above, a tolerance or acceptable error (or "limit") may be predefined or defined as part of the method. At 1210, the method 1200 may determine if the error calculated at 1208 is greater than the tolerance. If it is (1210 determination is 'YES'), the method 1200 may proceed to 1212, where the method 1200 may include adjusting one or more parameters of the model, in an effort to tune the model and result in the simulated position at the next survey depth more closely matching the measured position. The parameters that are adjusted may be associated, for example, with the BHA components and/or the geological/geophysical characteristics of the subterranean formation that is at least partially between the prior and next depths, e.g., the formation through which the section of the well between the prior and next survey depths traverses. The method 1200 may then iterate back to simulating the virtual high-density survey at 1206 and repeat 1206-1210.

Eventually, or potentially initially, the simulated and surveyed positions at the next depth may be within the tolerance, and thus the determination at 1210 may be 'NO'. The method 1200 may then proceed to adding the simulated high-density survey to the simulated trajectory of the well, as at 1214. In other words, the simulated high-density survey for the section between the prior and next survey points may be accepted.

The method 1200 may then determine whether there is another section of the well to simulate, e.g., whether there is another survey depth to serve as the "next" survey depth, as at 1216. If there is, the method 1200 may loop back to selecting the prior and next survey depths at 1204. For example, the next depth from the previous iteration may now be the prior depth, and the new next depth may be the next consecutive depth. Thus, the method 1200 may move on to the next section, at least in this example.

Figure 13:
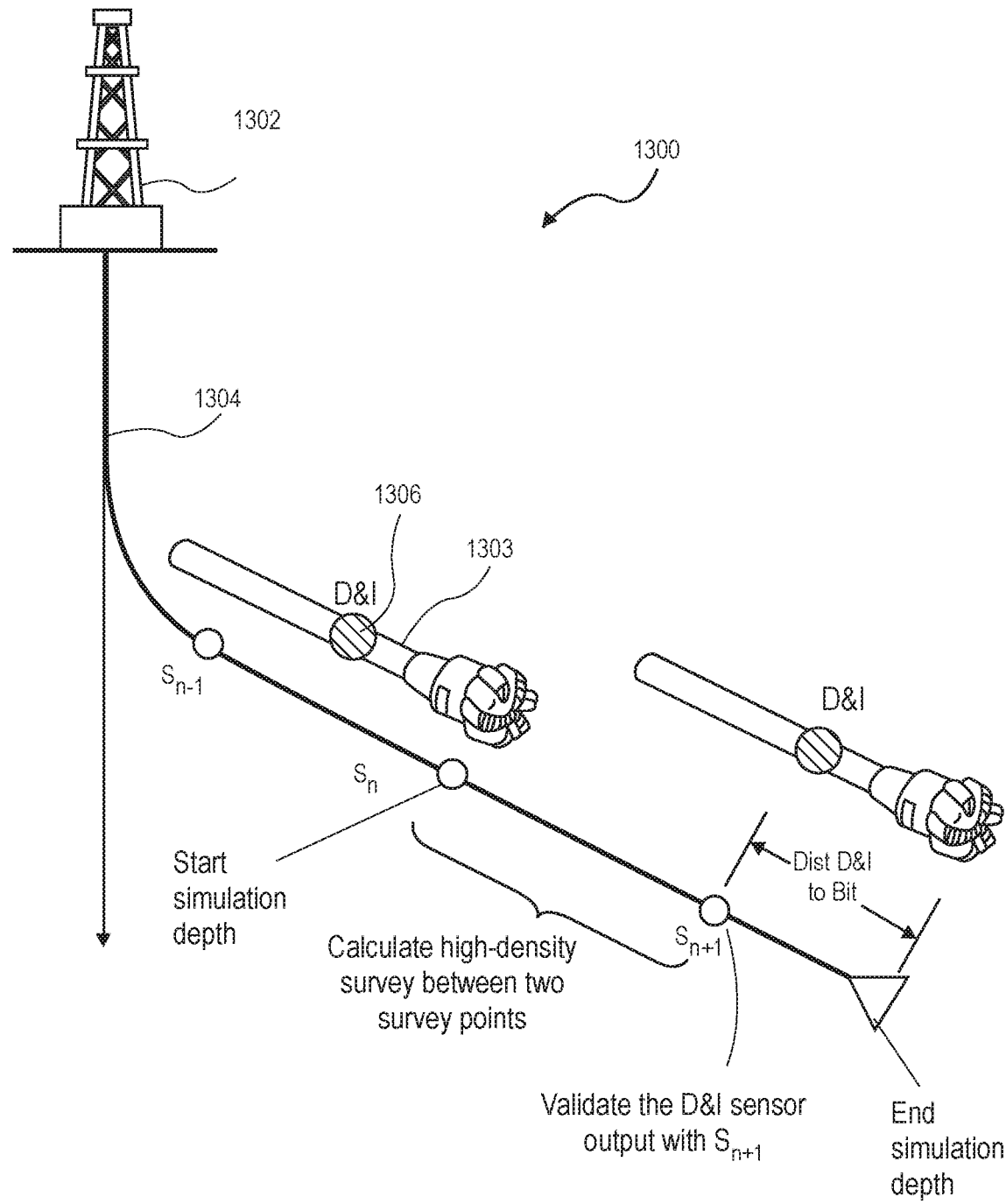
FIG. 13 illustrates a schematic view of a drilling system, according to an embodiment.

FIG. 13 illustrates a conceptual view of a drilling system 1300 that may be used to facilitate implementation of the method 1200 (and/or 500), according to an embodiment. The drilling system 1300 may include surface equipment 1302 ("surface" in this context refers to equipment located at or near ground-level). The drilling system 1300 may include a bottom hole assembly (BHA) 1303, which may be used to drill a well 1304. Further, the BHA 1303 may include a surveying sensor 1306, for example, a direction and inclination (D&I) sensor.

The sensor 1306 may measure the position of the BHA 1303 at survey depths S. The method 1200 may employ the model, as explained above, to calculate simulated positions between each consecutive survey depth (e.g., between a prior depth Sn and a next depth Sn+1). The simulation may then be validated based on the similarity between the measured position at the next depth Sn+1 and the simulated position at the same next depth Sn+1. Once completed, the method 1200 may move onto the next interval between consecutive depths (e.g., Sn+1 and Sn+2).

Figure 14:
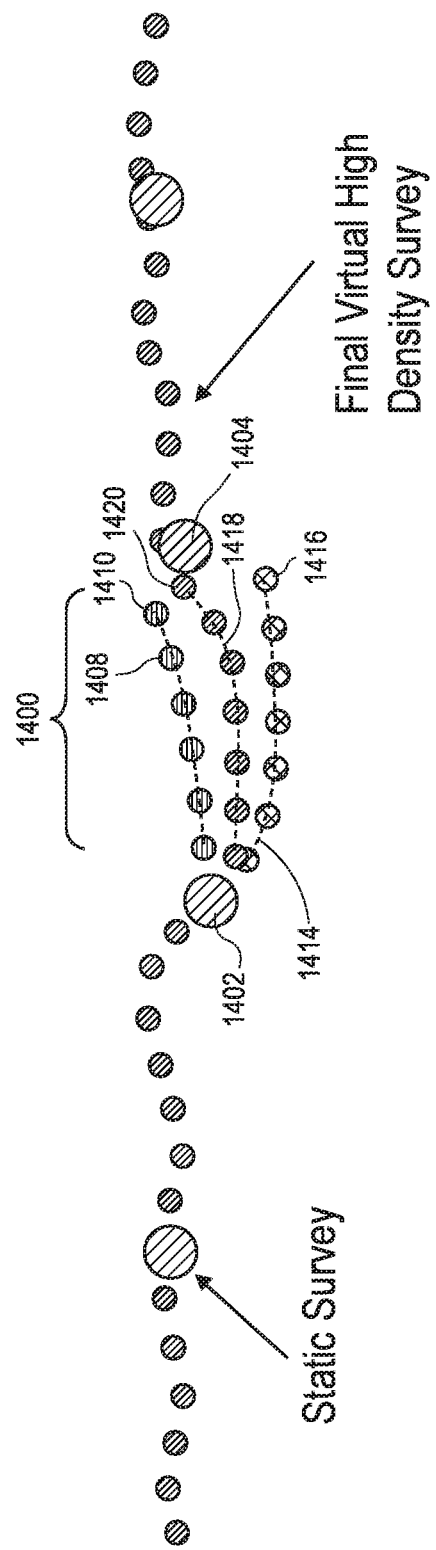
FIG. 14 illustrates a conceptual view of section-by-section simulation of the virtual high-density survey, according to an embodiment.

FIG. 14 illustrates a schematic representation of tuning the model for the virtual high-density survey, according to an embodiment. For example, the simulation may be calculating a virtual high-density survey for the well section 1400 between prior depth, represented by measured position 1402, and a next depth, represented by measured position 1404. A first iteration 1408 may result in a simulated position 1410 at the next depth 1404 that is too far in one direction from a measured position 1412. Thus, the model parameter(s) may be adjusted. A second iteration 1414 may result in a simulated position 1416 that is too far in another direction from the measured position 1414. After adjusting the model parameter(s) again, a third iteration 1418 may result in a simulated position 1420 that is sufficiently close to the measured position 1412. As such, the third iteration 1418 may be accepted, the other iterations deleted, and the method 1200 may proceed to simulating the virtual high-density survey for another section between two surveyed depths.

When the last well section to be considered (which may or may not be the last of the well) has been simulated (determination at 1216 is 'NO'), the method may proceed to 1218 and calculate the well tortuosity based on the virtual high-density survey of the sections that were simulated. Examples of such calculation are provided above. The method 1200 may also extend to associating the calculated tortuosities to other metrics and analytics, thereby enhancing subsequent well planning operations, as also explained above. Subsequently, a well may be drilled according to the enhanced well plan generated with knowledge of the calculated tortuosities.

Figure 15:
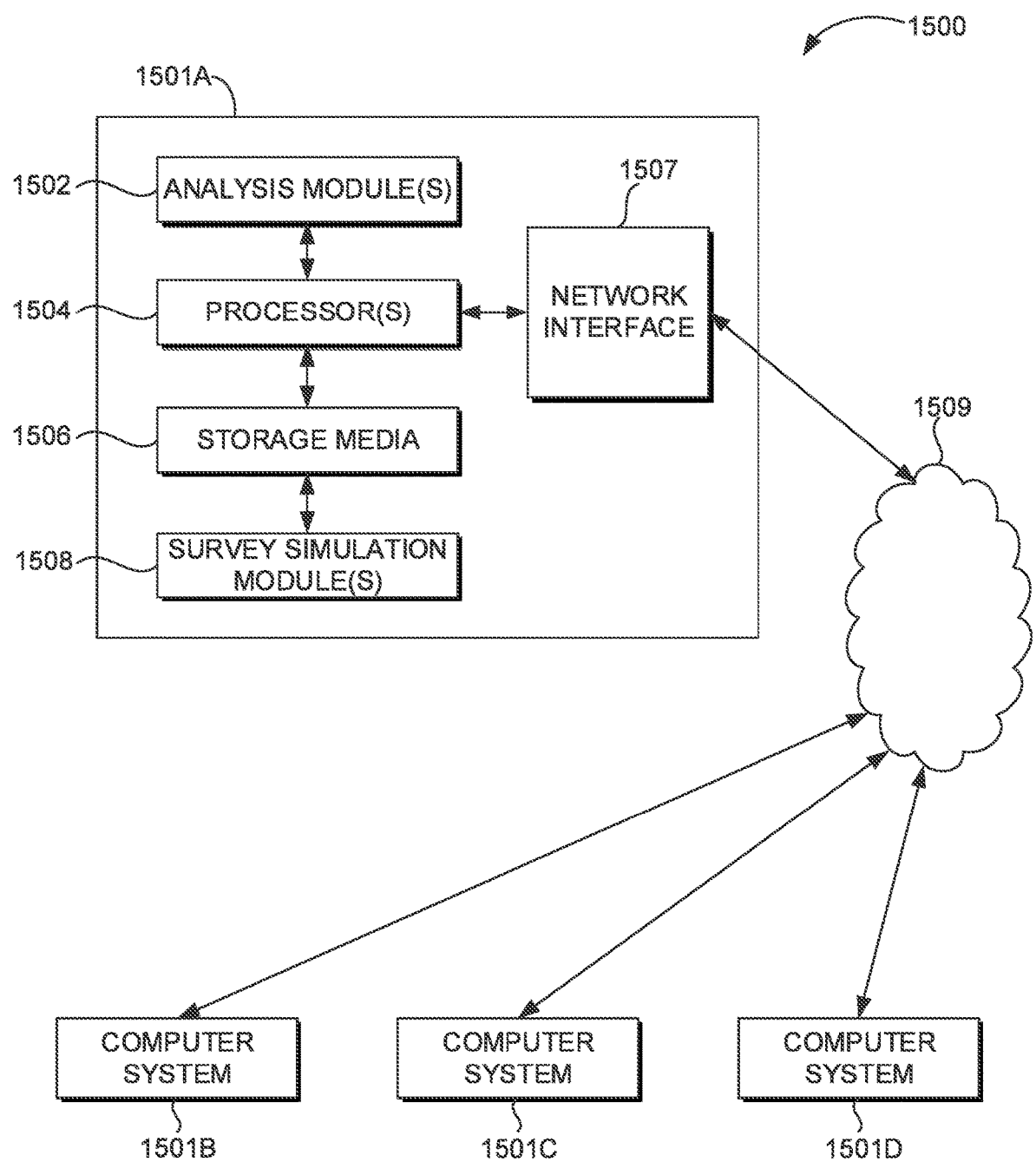
FIG. 15 illustrates a schematic view of a computing system, according to an embodiment.

In some embodiments, the methods of the present disclosure may be executed by a computing system. FIG. 15 illustrates an example of such a computing system 1500, in accordance with some embodiments. The computing system 1500 may include a computer or computer system 1501A, which may be an individual computer system 1501A or an arrangement of distributed computer systems. The computer system 1501A includes one or more analysis modules 1502 that are configured to perform various tasks according to some embodiments, such as one or more methods disclosed herein. To perform these various tasks, the analysis module 1502 executes independently, or in coordination with, one or more processors 1504, which is (or are) connected to one or more storage media 1506. The processor(s) 1504 is (or are) also connected to a network interface 1507 to allow the computer system 1501A to communicate over a data network 1509 with one or more additional computer systems and/or computing systems, such as 1501B, 1501C, and/or 1501D (note that computer systems 1501B, 1501C and/or 1501D may or may not share the same architecture as computer system 1501A, and may be located in different physical locations, e.g., computer systems 1501A and 1501B may be located in a processing facility, while in communication with one or more computer systems such as 1501C and/or 1501D that are located in one or more data centers, and/or located in varying countries on different continents).

A processor may include a microprocessor, microcontroller, processor module or subsystem, programmable integrated circuit, programmable gate array, or another control or computing device.

The storage media 1506 may be implemented as one or more computer-readable or machine-readable storage media. Note that while in the example embodiment of FIG. 15 storage media 1506 is depicted as within computer system 1501A, in some embodiments, storage media 1506 may be distributed within and/or across multiple internal and/or external enclosures of computing system 1501A and/or additional computing systems. Storage media 1506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1500 contains one or more survey simulation module(s) 1508. In the example of computing system 1500, computer system 1501A includes the survey simulation module 1508. In some embodiments, a survey simulation module may be used to perform some aspects of one or more embodiments of the methods disclosed herein. In other embodiments, a plurality of survey simulation modules may be used to perform some aspects of methods herein.

It should be appreciated that computing system 1500 is merely one example of a computing system, and that computing system 1500 may have more or fewer components than shown, may combine additional components not depicted in the example embodiment of FIG. 15, and/or computing system 1500 may have a different configuration or arrangement of the components depicted in FIG. 15. The various components shown in FIG. 15 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1500, FIG. 15), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
   obtaining a planned trajectory for a hole;
   obtaining a first survey of the hole using a sensor deployed into the hole, wherein the first survey includes a first surveyed position at a first depth of the hole and a second surveyed position at a second depth of the hole, and wherein the first survey does not include any surveyed positions at any depth between the first and second depths;
   generating a virtual high density survey based at least in part on the first survey and a model representing a subterranean formation through which at least a part of the hole extends, wherein generating comprises:
      simulating a second survey of a first portion of the hole between the first and second depths using a model representing the subterranean formation through which at least part of the first portion extends, wherein the second survey includes a plurality of simulated positions of the hole, including a simulated position at the second depth and one or more simulated positions at one or more depths between the first and second depths;
      determining that the simulated position at the second depth is not proximal to the second surveyed position within a tolerance; and
      in response to determining that the simulated position at the second depth is not proximal to the second surveyed position within the tolerance, adjusting a geological characteristic, a geophysical characteristic, or both of the subterranean formation represented in the model;
   calculating a tortuosity of the hole based at least in part on the virtual high density survey, wherein the tortuosity comprises a value representing a difference in position between a planned trajectory and the trajectory of the hole represented by the virtual high density survey;
   modifying the model by generating a representation of the trajectory of the hole in the model based at least in part on the virtual high density survey; and
   avoiding real-time drill hazards by changing drilling parameters based on the model.

2. The method of claim 1, wherein the first survey includes a plurality of surveyed positions, including the first and second surveyed positions, at a plurality of surveyed depths, including the first and second depths, and does not include any surveyed positions between consecutive depths of the plurality of surveyed depths.

3. The method of claim 2, further comprising simulating the second survey for one or more second portions of the hole between a prior depth and a next depth, wherein the prior depth and the next depth are consecutive depths in the plurality of surveyed depths, and wherein simulating the second survey of the one or more second portions of the hole generates a next simulated position at the next depth and a plurality of simulated positions between the prior depth and the next depth.

4. The method of claim 3, further comprising:
determining that the next simulation position is not proximal to the next surveyed position of the plurality of surveyed positions at the next depth;
in response to determining that the next simulation position is not proximal to the next surveyed position of the plurality of surveyed positions at the next depth, adjusting one or more parameters of the model associated with a geological characteristic, a geophysical characteristic, or both of the subterranean formation represented in the model at least partially between the prior depth and the next depth; and
again simulating the second survey of the one or more second portions of the hole starting at the prior depth and ending at the next depth.

5. The method of claim 4, further comprising, after again simulating the trajectory:
determining that the next simulation position is proximal to the next surveyed position within the tolerance; and
in response to determining that the next simulation position is proximal to the next surveyed position within the tolerance, determining a tortuosity of the hole based in part on the plurality of simulated positions between the prior depth and the next depth.

6. The method of claim 4, wherein the one or more parameters comprise one or more parameters selected from the group consisting of sliding sheet, directional drilling commands, drilling parameters, rate of penetration, friction, formation hardness, bit characteristics, and formation anisotropy.

7. The method of claim 6, further comprising:
correlating the tortuosity with one or more elements selected from the group consisting of:
a combination of components of a drilling assembly used to drill hole,
a fatigue life of one or more components of the drilling assembly, and
a drilling event or hazard experienced while drilling the hole using the drilling assembly; and
adjusting one or more drilling parameters based on the tortuosity, the correlated one or more elements.

8. The method of claim 1, wherein calculating the tortuosity comprises:
calculating dogleg severity values for two or more adjacent simulated positions of the hole; and
calculating a difference in the dogleg severity values for the two or more adjacent simulated positions of the hole.

9. The method of claim 1, further comprising generating and transmitting a control signal configured to adjust a drilling parameter based at least in part on the virtual high density survey.

10. The method of claim 1, further comprising using or changing drilling equipment based at least in part on the virtual high density survey.

11. A non-transitory computer-readable medium storing instructions that, when executed by one or more processors of a computing system, cause the computing system to perform operations, the operations comprising:
obtaining a planned trajectory for a hole;
obtaining a first survey of the hole using a sensor deployed into the hole, wherein the first survey includes a first surveyed position at a first depth of the hole and a second surveyed position at a second depth of the hole, and wherein the first survey does not include any surveyed positions at any depth between the first and second depths;
generating a virtual high density survey based at least in part on the first survey and a model representing a subterranean formation through which at least a part of the hole extends, wherein generating comprises:
simulating a second survey of a first portion of the hole between the first and second depths using a model representing the subterranean formation through which at least part of the first portion extends, wherein the second survey includes a plurality of simulated positions of the hole, including a simulated position at the second depth and one or more simulated positions at one or more depths between the first and second depths;
determining that the simulated position at the second depth is not proximal to the second surveyed position within a tolerance; and
in response to determining that the simulated position at the second depth is not proximal to the second surveyed position within the tolerance, adjusting a geological characteristic, a geophysical characteristic, or both of the subterranean formation represented in the model;
calculating a tortuosity of the hole based at least in part on the virtual high density survey, wherein the tortuosity comprises a value representing a difference in position between a planned trajectory and the trajectory of the hole represented by the virtual high density survey;
modifying the model by generating a trajectory of the hole in the model based at least in part on the virtual high density survey;
visualizing at least a portion of the model, including the trajectory of the hole based on the first and second surveys; and
avoiding real-time drill hazards by changing drilling parameters based on the model.

12. The medium of claim 11, wherein the first survey includes a plurality of surveyed positions, including the first and second surveyed positions, at a plurality of surveyed depths, including the first and second depths, and does not include any surveyed positions between consecutive depths of the plurality of surveyed depths.

13. The medium of claim 12, wherein the operations further comprise simulating the second survey for one or more second portions of the hole between a prior depth and a next depth, wherein the prior depth and the next depth are consecutive depths in the plurality of surveyed depths, and wherein simulating the second survey of the one or more second portions of the hole generates a next simulated position at the next depth and a plurality of simulated positions between the prior depth and the next depth.

14. The medium of claim 13, wherein the operations further comprise:
determining that the next simulation position is not proximal to the next surveyed position of the plurality of surveyed positions at the next depth;
in response to determining that the next simulation position is not proximal to the next surveyed position of the plurality of surveyed positions at the next depth, adjusting one or more parameters of the model associated with a geological characteristic, a geophysical characteristic, or both of the subterranean formation represented in the model at least partially between the prior depth and the next depth; and again simulating the second survey of the one or more second portions of the hole starting at the prior depth and ending at the next depth.

15. The medium of claim 14, wherein the operations further comprise, after again simulating the trajectory:
   determining that the next simulation position is proximal to the next surveyed position within the tolerance; and
   in response to determining that the next simulation position is proximal to the next surveyed position within the tolerance, determining a tortuosity of the hole based in part on the plurality of simulated positions between the prior depth and the next depth.

16. The medium of claim 14, wherein the one or more parameters comprise one or more parameters selected from the group consisting of sliding sheet, directional drilling commands, drilling parameters, rate of penetration, friction, formation hardness, bit characteristics, and formation anisotropy.

17. The medium of claim 16, wherein the operations further comprise:
   correlating the tortuosity with one or more elements selected from the group consisting of:
      a combination of components of a drilling assembly used to drill hole,
      a fatigue life of one or more components of the drilling assembly, and
      a drilling event or hazard experienced while drilling the hole using the drilling assembly; and
   adjusting one or more drilling parameters based on the tortuosity, the correlated one or more elements.

18. A computing system, comprising:
   one or more processors; and
   a memory system comprising one or more non-transitory computer-readable media storing instructions that, when executed by at least one of the one or more processors, cause the computing system to perform operations, the operations comprising:
      obtaining a planned trajectory for a hole;
      obtaining a first survey of the hole using a sensor deployed into the hole, wherein the first survey includes a first surveyed position at a first depth of the hole and a second surveyed position at a second depth of the hole, and wherein the first survey does not include any surveyed positions at any depth between the first and second depths;
      generating a virtual high density survey based at least in part on the first survey and a model representing a subterranean formation through which at least a part of the hole extends, wherein generating comprises:
         simulating a second survey of a first portion of the hole between the first and second depths using a model representing the subterranean formation through which at least part of the first portion extends, wherein the second survey includes a plurality of simulated positions of the hole, including a simulated position at the second depth and one or more simulated positions at one or more depths between the first and second depths;
         determining that the simulated position at the second depth is not proximal to the second surveyed position within a tolerance; and
         in response to determining that the simulated position at the second depth is not proximal to the second surveyed position within the tolerance, adjusting a geological characteristic, a geophysical characteristic, or both of the subterranean formation represented in the model;
      calculating a tortuosity of the hole based at least in part on the virtual high density survey, wherein the tortuosity comprises a value representing a difference in position between a planned trajectory and the trajectory of the hole represented by the virtual high density survey;
      modifying the model by generating a trajectory of the hole in the model based at least in part on the virtual high density survey;
      visualizing the trajectory of the hole based on the first and second surveys; and
      avoiding real-time drill hazards by changing drilling parameters based on the model.

19. The system of claim 18, wherein the first survey includes a plurality of surveyed positions, including the first and second surveyed positions, at a plurality of surveyed depths, including the first and second depths, and does not include any surveyed positions between consecutive depths of the plurality of surveyed depths.

20. The system of claim 19, wherein the operations further comprise simulating the second survey for one or more second portions of the hole between a prior depth and a next depth, wherein the prior depth and the next depth are consecutive depths in the plurality of surveyed depths, and wherein simulating the second survey of the one or more second portions of the hole generates a next simulated position at the next depth and a plurality of simulated positions between the prior depth and the next depth.

21. The system of claim 20, wherein the operations further comprise:
   determining that the next simulation position is not proximal to the next surveyed position of the plurality of surveyed positions at the next depth;
   in response to determining that the next simulation position is not proximal to the next surveyed position of the plurality of surveyed positions at the next depth, adjusting one or more parameters of the model associated with a geological characteristic, a geophysical characteristic, or both of the subterranean formation represented in the model at least partially between the prior depth and the next depth; and
   again simulating the second survey of the one or more second portions of the hole starting at the prior depth and ending at the next depth; and
   after again simulating the trajectory:
      determining that the next simulation position is proximal to the next surveyed position within the tolerance; and
      in response, determining the tortuosity of the hole based in part on the plurality of simulated positions between the prior depth and the next depth.

* * * * *